United States Patent [19]

Wegwerth

[11] 4,082,896
[45] Apr. 4, 1978

[54] ABRASION RESISTANT COATINGS

[75] Inventor: Arthur A. Wegwerth, Maplewood, Minn.

[73] Assignee: Minnesota Mining and Manufacturing Company, St. Paul, Minn.

[21] Appl. No.: 665,412

[22] Filed: Mar. 10, 1976

Related U.S. Application Data

[63] Continuation-in-part of Ser. No. 561,705, Mar. 25, 1975, abandoned.

[51] Int. Cl.² .................. B32B 27/38; C08L 1/14; C08L 1/28
[52] U.S. Cl. .................. 428/413; 260/13; 260/824 EP; 260/836; 260/837 PV
[58] Field of Search .............. 260/13, 824 EP, 836, 260/837 PV; 428/413, 433, 334, 414, 415, 416, 417, 418

[56] References Cited

U.S. PATENT DOCUMENTS

| | | | |
|---|---|---|---|
| 2,843,560 | 7/1958 | Mika | 260/13 |
| 3,131,161 | 4/1964 | Nitzsche et al. | 260/37 SB |
| 3,632,843 | 1/1972 | Allen et al. | 260/2 EC |
| 3,779,988 | 12/1973 | Rembold | 260/13 |
| 3,794,556 | 2/1974 | Young | 428/447 |
| 3,907,706 | 9/1975 | Robins | 260/2 EC |
| 3,955,035 | 5/1976 | Ito et al. | 428/334 |

*Primary Examiner*—Edward M. Woodberry
*Attorney, Agent, or Firm*—Cruzan Alexander; Donald M. Sell; Mark A. Litman

[57] ABSTRACT

Abrasion resistant polymeric coatings in which the polymer comprise the polymerized product of at least 15% by weight of an epoxy-terminated silane have improved film forming properties without significant loss of abrasion resistance if the epoxy-terminated silane composition is cured in the presence of 0.05 to 5% by weight of a polymeric additive selected from the class of polyvinyl butyral, polyvinyl formal, polyvinylpyrrolidone, polyvinylchloride, cellulose acetate butyrate, cellulose acetate propionate and ethylcellulose.

12 Claims, No Drawings

ABRASION RESISTANT COATINGS

This application is a continuation-in-part of U.S. Ser No. 561,705, filed 25 Mar., 1975, and now abandoned.

Abrasion resistant coatings have generally been used to protect against surface damage to substrates. For example, optical lenses are coated to prevent marring or scratching of the lens surface. These abrasion resistant coatings are ordinarily thin coatings of plastic cured in situ as a coating on the substrate.

Many compositions and methods have been previously suggested for applying abrasion resistant coatings to damageable substrates, but each suffers in a different fashion. Some compositions provide only minimum improvements in abrasion resistance while others are not practicable because of extreme processing conditions or excessive costs. For example, some of the modestly successful coatings require cure temperatures of about 150° C or more for extended periods of time. Such procedures are useless for coating imageable materials such as photoconductive sheets and electrophotographic sheets as well as any temperature sensitive substrate such as thermoplastic materials. Even for coating thermosetting polymers such conditions cause warping and decomposition.

Earlier methods for imparting abrasion resistance included vapor deposition of inorganic materials (e.g., metal oxides such as $SiO_2$, $ZrO_2$, etc.). Other inorganic materials used for abrasion resistant coatings are disclosed in U.S. Pat. Nos. 2,768,909 and 3,460,956. The former patent discloses coatings up to 1 micron in thickness of hydrolyzable metal organic esters. Thicker coatings are described as undesirable because of reduction in transparency, cohesion, and adhesion. Other coatings to increase abrasion resistance include organic resins and organic/inorganic blends such as are described in U.S. Pat. Nos. 2,481,809; 3,324,055; 3,575,998; 3,632,715; 3,642,681; 3,708,225; and 3,817,905.

Abrasion resistant coatings described in copending U.S. patent applications Ser. Nos. 513,116 and 615,025 in the name of T. C. Sandvig filed Oct. 8, 1974 and Sept. 19, 1975, respectively, and U.S. Ser. No. 556,392 filed Mar. 7, 1975 and U.S. Ser. No. 659,527, filed Feb. 19, 1976, in the name of M. S. Nozari have solved most of these problems. These applications are incorporated in their entirities.

It is still another aspect of this invention to remove or at least reduce the incidence of pin-holes in such abrasion resistant compositions and coatings without significantly reducing the abrasion resistance of the composition or coating.

These and other aspects of the invention shall be pointed out in the following description of the invention.

In the practice of the present invention it has been found that the addition of polyvinyl butyral, polyvinyl formal, polyvinyl chloride, polyvinylpyrrolidone, cellulose acetate propronate, ethylcellulose and/or cellulose acetatebutyrate to the reaction mixture of a composition comprising epoxy-terminated silane generally provides a substantially pin-hole free abrasion resistant coating upon curing.

Even mechanical working may be performed during the cure and pin-hole reduction is still effected.

The coatings useful in the practice of the present invention are rapid curing, highly abrasion resistant, and resistant to corrosives and solvents. The low surface energy of the cured coatings further prevents adherence of foreign material to the surface. These coatings may be used as protective coatings on a wide variety of substances, including metal, glass, wood, ceramics, natural and synthetic polymeric materials, etc.

The coatings of the present invention comprise at least one epoxy-terminated silane, comprising 15% by weight of the polymerizable material, polymerized in the presence of the described polymer additives. Materials copolymerizable with the epoxy and silane group of the epoxy-terminated silane can be added to the system to modify its properties, up to 85% by weight of the polymer.

(1) EPOXY TERMINATED SILANES

Epoxy-terminated silanes are compounds or materials having terminal epoxy groups and terminal silane groups, the bridging of these groups being through an aliphatic, aromatic, or aliphatic and aromatic divalent hydrocarbon linkage which may have N and/or O atoms in the linkage chain. The O atoms for example would be within the chain only as ether linkages. These linkage chains may be generally substituted as is well known in the art, as these substituents onto the chain do not greatly affect the functional ability of the epoxy-terminated silanes to undergo the essential reactions necessary for polyermization through the siloxane or epoxy terminal groups. Examples of substituents which may be present on the linkage or bridging moieties are groups such as $NO_2$, $CH_3$, $(CH_2)_nCH_3$, OH, SH, halogen, etc. In general structural formulae appearing within this description of the invention, such substitution of the bridging moieties is implied unless specifically excluded by language such as unsubstituted divalent hydrocarbon radical.

Examples of preferred epoxy terminated silane useful in the practice of this invention are compounds of the general formulae:

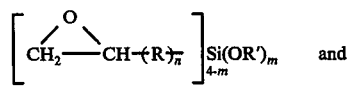 and

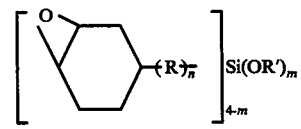

where R = a non-hydrolyzable divalent hydrocarbon radical (aliphatic, aromatic, or aliphatic and aromatic containing) of less than 20 carbon atoms or a divalent radical of less than 20 carbon atoms composed of C, H, N, S, and O atoms (these atoms are the only atoms which may appear in the backbone of the divalent radicals), the last being in the form of ether linkages. No two hetero atoms may be adjacent within the backbone of the divalent hydrocarbon radical. This description defines divalent hydrocarbon radicals for epoxy terminated silanes in the practice of this invention. The value of $n$ is from 0 to 1, R' is an aliphatic hydrocarbon radical of less than 10 carbon atoms, an acyl radical of less than 10 carbon atoms, or a radical of formula $(CH_2CH_2O)_kZ$ in which $k$ is an integer of at least 1 and Z is an aliphatic hydrocarbon radical of less than 10 carbon atoms or hydrogen, $m$ has values of 1 to 3.

The compositions employed in this invention can be an epoxy silane of the above formula in which R is any divalent hydrocarbon radical such as methylene, ethylene, decalene, phenylene, cyclohexylene, cyclopentylene, methylcyclohexylene, 2-ethylbutylene, and allene or an ether radical such as —CH$_2$—CH$_2$—O—CH$_2$—CH$_2$—, (CH$_2$—CH$_2$O)$_2$—CH$_2$—CH$_2$—,

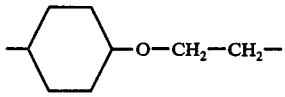

and —CH$_2$O—(ch$_2$)$_3$—, R' can by any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula (CH$_2$CH$_2$O)$_k$Z in which $k$ is an integer of at least 1, for example 2, 5, and 8, and Z is hydrogen or any aliphatic hydrocarbon radical of less than 10 carbon atoms such as methyl, ethyl, isopropyl, butyl, vinyl and allyl.

In addition to any of the above silanes the compositions of this invention can be any hydrolyzate or precondensate of the said silanes. These hydrolyzates can be formed by the partial or complete hydrolysis of the silane OR' groups. Thus the term precondensate includes siloxanes in which some or all of the silicon atoms are bonded through oxygen atoms. The following compounds are illustrative of some of useful materials in the process of this invention and should not be construed as limiting the invention which is properly explained above:

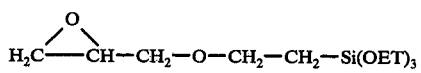

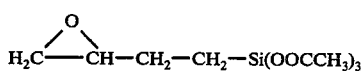

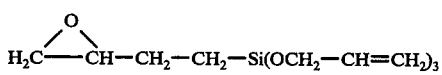

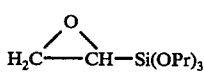

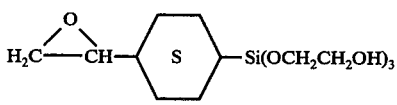

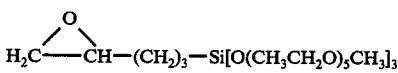

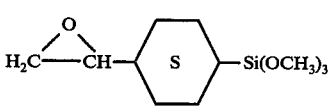

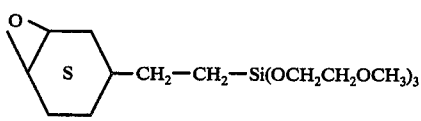

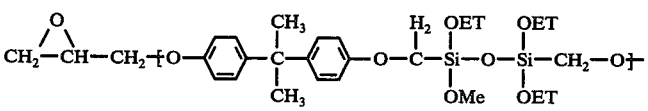

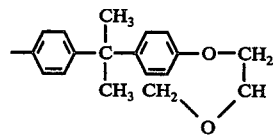

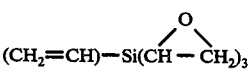

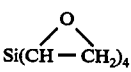

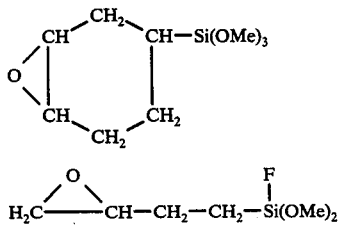

The preparation of most of the above compounds have been described in the U.S. Pat. No. 3,131,161.

(2) The metal ester containing abrasion resistant coatings comprise a composition comprising:
(1) at least 15% by weight of all polymerizable materials of an epoxy terminated silane, and
(2) a metal ester of aluminum, titanium, or zirconium having at least two ester groups of the formula —OR directly bonded to the metal wherein R is hydrocarbyl of 1 to 18 carbon atoms, and more preferably alkyl or acyl of 1 to 8 carbon atoms. The remaining valences of the metal may be satisfied by organic moieties, inorganic moieties, complexing agents or even repeating —O—T$_1$—O— groups, etc. (Preferably, if OR groups are not used, halides or alkyl groups are used). As long as two of the ester groups are present, the metal ester can react into the final polymeric structure to form an abrasion resistance coating.

It is generally preferred that all valences of the metal are satisfied by ester groups, but the other groups may be present so long as at least two ester groups are present. Compounds of the formula $$R_n'M(OR)_{m-n}$$

and therefore useful, wherein R is as defined above, $m$ is the valence of M and $n$ is 0, 1, or 2 such that $m-n$ is always at least 2, and R' is an organic or inorganic moiety bonded to M or a complexing agent satisfying the valence requirements of M. Compounds of the formula $$M(OR)_m$$

are generally preferred because of availability and generally improved characteristics.

It is critical that the metal ester not be hydrolyzed completely or hydrolyzed to a condition where less than two ester groups per titanium atom are present on the metal ester. If the metal ester is so hydrolyzed, the epoxy-terminated silane and the metal ester will coprecipitate into an insoluble material because reactive sites for the silane on the ester have been removed.

The present coating compositions are prepared simply by the admixing or blending of the metal ester and silane at room temperature (e.g., 25° C) and allowing the materials to react. Other additives such as leveling agents, colorants and viscosity modifiers may be included by mixing them with the ester and silane. Typically, the coating composition is filtered through a 10 micron filter before application.

It is preferred that the reactants in the coating compositions not be hydrolyzed. Although reactants which are partially hydrolyzed can be used, the amount of water which may be present in the compositions must not be more than one-half equivalent per equivalent of metal ester. For example, use of water over this amount in compositions containing titanium ester results in formation of titanium dioxide which readily precipitates out of the composition. Another disadvantage with the use of hydrolyzed reactant is that an additional step is required in the presentation of the coating compositions. Furthermore, hydrolyzed reactants do not possess the desirable shelf stability exhibited by unhydrolyzed reactants.

It has been found that the molar ratios of the metal ester to the reactive silane may be varied depending upon the coating system chosen. For example, in the compositions containing the titanium ester and an epoxy-functional silane, the molar ratio of metal ester to silane may vary from about 1:0.5 to about 1:7 with the most preferred ratio being 1:4.

(3) Another type of coating in the practice of this invention uses highly fluorinated aliphatic sulfonylic and sulfonic catalysts for the polymerization of the epoxy-terminated silane materials.

The sulfonic materials are defined as a highly fluorinated aliphatic sulfonic acid or salt thereof. The sulfonylic materials are defined as a compound containing two highly fluorinated aliphatic sulfonyl groups attached directly to an imide or methylene e.g., —NR'— or CR'R''. The sulfonic materials may be partially represented by the formula

wherein R is selected from hydrogen, ammonium cation and metal cation and $n$ is the valence of R.

The sulfonylic catalysts may be partially represented by the formula

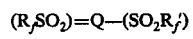

wherein Q is a divalent radical selected from

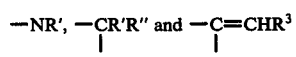

wherein
R'' is selected from hydrogen, chlorine, bromine, iodine, R$_f$SO$_2$, alkenyl of 3 to 4 carbon atoms, alkyl of 1 to 20 carbon atoms (preferably 1 to 4), aryl of up to 20 carbon atoms (preferably 1 to 10), and alkaryl of up to 20 carbon atoms (preferably 7 to 10), R$^3$ is H, alkenyl of 3 carbons and aryl of up to 20 carbons, and
R' is selected from hydrogen, chlorine, bromine, iodine, ammonium cations or metal cations.

The catalysts wherein the N or C atom bonded to the highly fluorinated aliphatic (preferably alkyl) groups has a hydrogen atom bonded thereto are active catalysts. Those having no hydrogen atom are latent and may be activated by heat, acid, chelating agent or combinations thereof as later exemplified.

Metals useful in the above definitions essentially includes all metals. All metals inclusive of and to the left of aluminum, germanium, antimony and polonium on the periodic chart of the elements, and the rare earth metals can function in the practice of this invention. The group Ia and IIa metals must be activated by acids and heat or chelating agents and heat, but they are functional. Examples of many metals are known in the art, including such diverse materials as lanthanum, so that all metals are known to work, even though some would be commercially useless because of expense. Preferably the metals would exclude elements 59-63, 65-71, and those above 89.

According to the Periodic Table in *Advanced Organic Chemistry*, Cotton and Wilkinson, 2d. Ed., Interscience publishers, 1966, more preferred metals would be those of Groups, Ia, IIa, VIa, VIII, Ib, IIb, IVb, and Vb and lanthanum, titanium, zirconium, chromium, molybdenum, manganese, cesium, and gadolinium based on economic considerations.

In the practice of this invention, $R_f$ and $R'_f$ are independently defined by highly fluorinated aliphatic (preferably alkyl) radical which encompasses highly fluorinated, saturated monovalent, aliphatic radicals having 1 to 20 carbon atoms. The skeletal chain of the radical may be straight, branched or, if sufficiently large (e.g. at least 3 or 5 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atoms. Preferably, the fluoroaliphatic radical is a saturated perfluoroalkyl radical having a skeletal chain that is straight or branched and has a formula $$C_xF_{2x+1}$$

wherein x has a value from 1 to 18.

The preferred active catalysts of this invention are those compounds having the formula $$(R_fSO_2)Q(O_2SR_f')$$

wherein
  $R_f$ and $R_f'$ are independently a highly fluorinated alkyl group, and
  Q is a divalent radical selected from —NH— and —CHR—
  wherein R is selected from Br, Cl, I, H, alkyl groups of 1 to 20 carbon atoms, alkenyl of 3 to 4 carbon atoms, aryl or aralkyl of up to 20 carbon atoms, or R'X,
  wherein R' is an alkylene group of up to 20 carbon atoms, and X is H, Br, Cl, I, —O$_2$SR$_f$, —CH(O$_2$SR$_f$)$_2$,

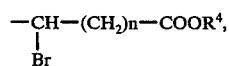

or —CY(COOR$^2$)$_2$ wherein R$^4$ is H or 1 to 8 alkyl and n is 0 – 8, and
wherein R$^2$ is alkyl of 1 to 4 carbon atoms or phenylalkyl, the alkyl group of which has 1 to 4 carbon atoms, and Y is H, Br, Cl, I, or NO$_2$.

These catalyst compounds are known in the art, although not for the cure of epoxy-terminated silanes into abrasion resistant coatings. Prior art disclosure of the sulfonic acids, sulfonylic acids and their derivatives is disclosed in such materials as U.S. Pat. Nos. 3,586,616; 3,632,843; 3,704,311; 3,758,531; 3,758,591; 3,758,592; 3,758,593; 3,776,960; 3,794,687; 3,842,019; 3,932,526; German D.S. No. 2,239,817; and U.S. application Ser. No. 556,494 filed Mar. 7, 1975 in the name of Koshar and Barber and Ser. No. 581,101 filed June 9, 1975 in the name of Koshar.

The curable compositions of this invention can be modified by incorporating therein any number of conventional fillers, e.g., reinforcing fillers such as finely divided silica, non-reinforcing fillers such as coarse silicas, diatomaceous earth, and metallic oxides such as titania, This basic composition, however, can be modified with a host of other copolymers, additives, and moisture sensitive compounds which can form a tight matrix with epoxy silanes to give abrasion resistant coating. Some of the modifiers include:

(a.) Moisture Sensitive Compounds Capable of Forming a Tight Matrix with Epoxy Silanes These include compounds with the general formula of $R_mM(OR')_n$ in which M is Si, Al, Zr, or Ti, R is a hydrocarbon group of less than 10 carbon atoms or a group composed of hydrogen, carbon and oxygen of less than 20 carbon atoms. R' is an alkyl or acyl group of less than 10 carbon atoms, m has values of 0, 1, 2, and 3 and n correspondingly is 4, 3, 2, or 1. These compounds may be used in a precondensate form or in some instances in the monomeric form. These compounds form a tight matrix with epoxy silanes to give abrasion resistant coatings. The following compounds are illustrative of the type of moisture sensitive materials that can be used in the process of this invention:

Si(OET)$_4$, CH$_3$SI(OET)$_3$, (CH$_3$)$_2$SI(OET)$_2$, (CH$_3$)$_3$SI(OET), (CH$_3$SCH$_2$CH$_2$)$_3$— SiOC$_2$H$_5$, C$_6$H$_5$Si(OET)$_3$, CH$_2$=CHSi(OAC)$_3$. (C$_6$H$_5$CH$_2$SCH$_2$CH$_2$)$_2$Si(oMe)$_2$, CH$_3$C$_6$H$_5$SCH$_2$(CH$_3$)CH Si(OC$_2$H$_5$)$_3$, CH$_2$=CHCOO(CH$_2$)$_3$ Si(OCH$_3$)$_3$, CH$_2$=CH(C$_2$H$_5$)COOCH$_2$ Si(OC$_2$H$_5$)$_3$, (C$_4$H$_9$O)$_4$ Ti, Ti(OC$_3$H$_7$)$_4$, Al(OC$_4$H$_9$)$_3$, (C$_2$H$_5$)$_2$ Al(OC$_2$H$_5$), (C$_3$H$_7$O)$_4$Zr.

(b) Other monomers

The disulfone catalysts work best on cationically polymerizable compounds, thus the other copolymerizable materials most useful in the process of this invention are those in which the comonomer is capable of cationic polymerization such as styrene, methyl styrene, vinyl amides and vinyl ethers. The best compounds, however, are the epoxy compounds such as 1,4-butanediol diglycidyl ether, diglycidyl ether of bisphenol A, and

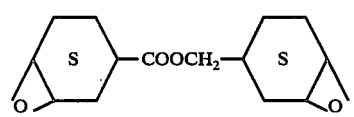

These compounds may be copolymerized with the epoxy terminated siloxanes or terpolymerized with the epoxy terminated siloxane and a moisture sensitive compound containing Si, Al, Ti or Zr. In general all other compounds that can be copolymerized with an epoxy or silane functionality are useful in the process of this invention with any of the described coatings.

(c.) Additives

Various additives such as dyestuffs, fine metals, metal oxides, conductive materials, leveling agents, flow control agents, U. V. absorbers, functional materials such as magnetic particles, and many other specific materials which serve a given purpose can be added to the basic resin system to obtain the desired properties. There is, however, the one limitation that the additives cannot be basic materials which would neutralize the disulfone catalyst and slow down the reaction rate significantly.

The compositions of the present invention may be cured by any of the methods known to those skilled in the art, electron-beam cure, catalyst cure (which may be for example, combined with heating of the composition), etc. The most preferred methods of cure in the practice of this invention are cure with a highly fluorinated alkyl-sulfonyl protonic acid, or high temperature oven cure.

The following examples will assist in a further understanding of the present invention.

EXAMPLE 1

3 parts by weight γ-glycidoxypropyltrimethoxy silane were mixed with 1 part by weight tetraisopropyl titanate. The solution was quickly spread onto a silicone coated release sheet and oven cured at 180° F for 16 hours. When removed from the oven and cooled, the cured resin was stripped from the release sheet. In an area of about 6 inches by 6 inches (15.3 cm × 15.3 cm). about 14 pinholes could be seen in the sheet.

To test for abrasion resistance, small squares of steel wool (about 7.6 cm per side) were pressed against the surface with applied force (weights were used) for 50 cycles and the sheets visually examined for scratching or marring. With the sheet of this example, 26 lbs (about 11.8 kg) weight was used on the steel wool. No scratching was seen.

EXAMPLES 2-6

In the following examples, identical procedures were used. Seventy-five parts by weight γ-glycidoxypropyl-trimethoxy silane were used. 0.75 parts by weight of the described polymers were added to the silane as 15% by weight solutions in a 50/50 weight mixture of toluene and ethanol. To the solution of silane and polymer was added 25 parts by weight of tetraisopropyl titanate. The final solutions were coated onto a silicon release sheet and oven cured at 180° F (82° C) for 16 hours. After cooling, the cured films were stripped from the release sheet and subjected to the abrasion test shown in Example 1 with various weights used. The data are recorded below:

| Ex. | POLYMER | ABRASION WT. (lbs.) | RESULTS |
|---|---|---|---|
| 2 | ethyl cellulose | 6 | no visible scratching |
|  |  | 11 | no visible scratching |
|  |  | 16 | numerous small scratches |
| 3 | vinyl chloride-vinyl acetate (50/50) copolymer | 6 | no visible scratching |
|  |  | 11 | some scratching noted |
|  |  | 16 | bad scratching |
| 4 | polystyrene | 6 | no scratches |
|  |  | 11 | small scratches |
|  |  | 16 | many scratches |
| 5 | polyvinyl butyral | 16 | no visible scratching |
| 6 | cellulose acetate butyrate | 16 | no visible scratching |

As can be seen from these results, the addition of polyvinyl butyral and cellulose acetate butyrate did not reduce abrasion resistance to steel wool at 16 lbs. pressure, and in both cases the incidence of pin-holes was significantly reduced or eliminated.

EXAMPLES 7-14

It is well known in the art that when coating discontinuities occur in the film, compositions sold on the market, generically known as flow control agents, can often be used to overcome the coating problems. Some of these materials are in the nature of surfactants, and the most important commerically available materials of these agents include, arylalkyl polyethers, lauryl sulfates, polymethyl methacrylate, polyesters of glycols and aliphatic dibasic acids, and small particles of silicon dioxide with very high surface area.

In the following examples, these commercially available flow control agents were evaluated under identical procedures. Solutions were made up of each of the flow control agents (in 0.05 g amounts) and a few additional polymeric materials in appropriate solvents (2 g amounts). After addition to 37.5 grams siloxane and then addition of 12.5 grams titanate ester (the same as in Example 1), the compositions were coated on polyvinyl butyral release sheets in 3 mil thickness, oven dried at 180° (82° C) for 16 hours and tested for abrasion resistance.

| Ex. | MATERIAL | SOLVENT (if any) | AMOUNT | ABRASION WEIGHT | RESULTS |
|---|---|---|---|---|---|
| 7 | polyvinyl acetate | toluene-ethanol 50/50 | 2.0 g | 5 | little scratching |
|  |  |  |  | 10 | very noticeable scratching |
|  |  |  |  | 15 | very bad scratching |
| 8 | polyvinylidene chloride 15% solution | toluene-ethanol 50/50 | 2.0 g | 5 | little scratching |
|  |  |  |  | 10 | moderate scratching |
|  |  |  |  | 15 | considerable scratching |
| 9 | arylalkyl polyether |  | .05 g | 15 | no scratching (did not reduce pin-holes) |
| 10 | lauryl sulfate |  | 0.5 g | 15 | no scratching (did not reduce pin-holes) |
| 11 | silicon dioxide particles |  | .05 g | 15 | no scratching (particles left visible spots in film) |
| 12 | polymethyl methacrylate | toluene-ethanol 50/50 | 2.0 g | 15 | no scratching (did not reduce pin-holes) |

| Ex. | MATERIAL | SOLVENT (if any) | AMOUNT | ABRASION WEIGHT | RESULTS |
|---|---|---|---|---|---|
| 13 | 15% solution polyvinyl butyral | toluene-ethanol 50/50 | 2.0 g | 15 15 | visible scratches no scratching no pin-holes |
| 14 | 15% solution cellulose acetate butyrate 15% | toluene-ethanol 50/50 | 2.0 g | 15 | no scratching no pin-holes |

As can be seen from the above data, only the addition of polyvinyl butyral and cellulose acetate butyrate reduced the incidence of pin-holes without reducing abrasion resistance or creating other optical problems.

It has been found in the practice of this invention that at least 0.05% by weight of the polymeric additives per weight of abrasion resistant composition is desirable in the practice of this invention. With lower molecular weight polymeric additives, more is needed to effect desirable results. With polymeric materials having a numerical average molecular weight (NAMW) above 45,000, 0.05% by weight effects desirable results. With polymeric materials having an NAMW of at least about 20,000, satisfactory results can be achieved with higher percentages. It is not desirable to use more than 5% by weight of abrasion resistant composition of the polymeric additives of the present invention. The more preferred range of additives is 0.10 to 3.0 weight and the most preferred range is 0.12 to 1.50% by weight.

The polymeric additive materials may be added in any convenient fashion to the reactants of the hardcoat composition, but it is generally preferable to add the materials to the silane with a compatible solvent and then add the catalyst or fast reacting ingredients (e.g., the metal esters). If the catalyst or other reactants are added to the silane first, there is often a problem with the mixture thickening so rapidly that the polymer cannot be evenly dispersed.

Substrate

The abrasion resistant coatings of the present invention are best used as coatings upon a substrate. Materials which are able to provide useful functions but do not have satisfactory abrasion resistance can be improved by the addition of coatings according to the present invention. Especially those materials which heretofore have not been coated to improve their resistance with any great success because of heat sensitivity (low melting point, destruction of heat unstable materials, etc.) can be readily improved according to the present invention because of the ability of the present composition to bond with essentially room temperature curing.

Solid substrates that can be coated are the surfaces of fibers, sheets, and shaped solid objects. Among the solid substrates particularly useful according to the present invention are ceramic materials (e.g., glass, fused ceramic sheeting and fibers), metals (e.g. sheets, fibers, aluminum, iron, silver, chromium and other metals), metal oxides, thermoplastic resins (e.g. polyesters, polyamides, polyolefins, polycarbonates, acrylic resins, polyvinyl chloride, cellulose acetate butyrate etc.), thermoset resins (e.g., epoxy resins, polysilanes, polysiloxanes, etc.) paper, wood, natural resins (e.g. rubber, gelatin), and, in general, any solid surface which needs protection from abrasion.

Where the substrate is not naturally adherent with the compositions of the present invention, primers may be used on the substrate. Many primers are known in the art, and their purpose is to provide a layer to which the coating more readily adheres than to the original surface of the substrate. For example, in the photographic art, primers are generally used on the polyethyleneterephthalate base to improve adhesion of subsequent layers thereto. Such primers, and other known primers, would be useful in the practice of the present invention.

The surface of the substrate may itself be treated to improve adherence such as by abrasion or corona discharge to enhance bonding of the abrasion resistant layer thereto.

A large number of primers can find utility in the practice of this invention and do not affect the proportion of the top abrasion resistant coating. Some of the most useful ones, however, are the acrylic based primers such as terpolymers of butylmethacrylate, methylmethacrylate, and methacryloxy propyltrimethoxy silane, dissolved in appropriate solvents. The ratio of the components of the terpolymer can be varied over a wide range to attain the optimum primary properties for a given substrate. This primer when used in appropriate solvents such as isopropylacetate, isopropanol, toluene-methanol mixtures or other mixed solvents find utility in priming a variety of substrates; such as polycarbonates, polymethylmethacrylates, cellulose acetate butyrate, polystyrene, aluminum, polyvinylchloride, silver halide - gelatin emulsions and a host of other organic and inorganic substrates. As far as the polyester is concerned, titania, silica, or polyvinylidene chloride are the best primers. A host of other commercial primers such as various aliphatic or aromatic urethanes, caprolactones, epoxies, and siloxanes can also find utility as primers for the coatings of the invention.

EXAMPLE 15

A precondensate of

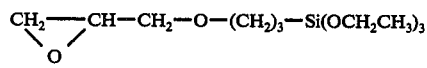

was formed by adding 8.0 g ethanol and 8.0 g of water to 16.5 grams of the monomeric epoxy-terminated siloxane in 16.5 g ethanol and then adding 1 drop of 0.1 N HCl. The volume was heated to 80° C to distill off volatiles. To this product was added ethanol to form a 40% by weight precondensate solution. To this solution, 1% by weight of a highly fluorinated alkylsulfonyl protonic acid catalyst, $(CF_3SO_2)_2 CHC_6H_5$, as a 25% weight solution in ethyl acetate was added.

Identical proportions of precondensate and catalyst were used in a second polymerization, but 1½% by weight cellulose acetate-butyrate resin was added to the precondensate prior to cure.

Each composition was hand coated on a polyvinyl butyral release sheet and oven cured at 160° F for 75 minutes. This produced, of course, only a partial cure, but the data are shown below.

The sample without butyrate resin scratched badly at 5 lbs. weight on the steel wool, used as in previous examples. The sample cured in the presence of the cellulose acetate-butyrate did not scratch at 5 lbs. and showed only slight scratching at 10 lbs. Considering that the product was only partially cured, these are dramatic results.

EXAMPLES 16-27

A reference composition of 25.0 g gamma glycidoxpropyltrimethoxysilane and 8.3 g tetraisopropyl titanate was made. This was spread at about 10 microns and cured for 90 minutes at 90° C. The coating was inconsistent, showing wave-type patterns and numerous small specks.

In each of the following examples, 0.75 g of the described polymeric additives were used as in Examples 2-6 with the reference composition prior to any curing. The results are tabulated below.

| Ex. | POLYMER | RESULTS |
|---|---|---|
| 16 | None | flow marks and specks |
| 17 | nitrocellulose | streaked coating |
| 18 | polystyrene | discoloration and small specks |
| 19 | ethylcellulose | excellent coating, few specks, less than 16% haze after falling sand test.* |
| 20 | polyvinyl acetate | poor coating, numerous specks |
| 21 | polyethyleneterephthalate | highly discolored, poor adhesion |
| 22 | polyvinylpyrrolidone | good even coating, very few specks, less than 17% haze after falling sand test |
| 23 | cellulose acetate propionate | good even coating, very few specks, slight but tolerable coloration, less than 16% haze |
| 24 | polyhexamethyleneadipamide | would not mix with coating |
| 25 | poly(acetonitrile-vinylidene chloride) | poor, streaked coating, very yellow |
| 26 | polyvinylchloride | extremely few specks, excellent coating, tolerable dimimution of abrasion resistance to 22% haze |
| 27 | ethylene dichloride | many specks, would not coat out |

*This procedure which is the same as that of ASTM Designation D968-51 (Reapproved 1972) with the modification that the specimen platform is rotated at about 60 rpm during the test. Percentage haze produced in the specimen is then measured using a Gardner Hazemeter (manufactured by Gardner Laboratory Inc., Bethesda, Maryland) in accordance with ASTM Designation D1003-64 (Procedure A) (Reapproved 1970).

The coatings of this invention are generally useful wherever the addition of an abrasion resistant coating would be desirable. Such obvious areas of utility include coatings on glass or plastic optic lenses, on reflective sheeting such as street signs, intensifying screens as known in the radiographic and related arts, protection of photoconductive and electrophotoconductive surfaces, on thermographic and photothermographic elements, desk and countertops (especially cutting surfaces), boat hulls and any other surface subject to abrasion.

The coatings of this invention have been found to have many properties generally improved over the prior art besides outstanding abrasion resistance and hardness which is, for example, as much as 50% greater than that for a standard abrasion resistant material in the art, Abcite$^R$ (a product of DuPont de Nemours, Inc.). The coatings are also highly impact resistant as tested by ASTM procedure D-1003-61 and as measured (haze measurement) by ASTM D-968-51. No more than 40% haze is tolerable in materials presently on the market and can easily be achieved with the present compositions. It is preferred to have no more than 30% haze, more preferably less than 25% haze and most preferably less than 20% haze, although presently available materials are not known to achieve these results. As shown in the Examples, haze percentages of less than 15 or 10 or even 5% can be achieved in the practice of this invention.

Surprisingly, the flexibility of the compositions of the present invention is extremely high for a hard abrasion resistant material. The compositions as a film often can be subjected to a bend around a one-inch diameter tube without cracking or stress marks. This is a degree of flexibility far greater than that of prior art abrasion resistant materials of any commerical value.

The term epoxy-terminated silane has been used generally throughout the specification, but as clearly shown by one of the structural formulae used in describing certain epoxy-substituted silanes, the epoxy group does not have to be terminal (i.e., a 1,2 epoxy group). Any epoxy group in a position on the non-hydrolyzable chain which is capable of polymerizing as epoxy groups are known to polymerize is included on the term epoxy-terminated silane. For example, the epoxy groups on the saturated rings are not truly terminal but are included within the definition, being silanes having polymerizable epoxy substituents on the molecule.

ASTM Designation D 968-51 (1966) may be summarized as follows: 2000±10 ml of standard sand (no more than 15 g retained in No. 20 sieve and not more than 5 g passes through No. 30 sieve after 5 minutes of continuous sieving of a 100 g sample) flows at a rate of 2 liters per 21 to 23.5 seconds onto a specimen of the material to be evaluated, said specimen held at an angle of 45° to the path of the falling sand, the closest point of impact on the specimen to the 0.750±0.003 inch I. D. 36±0.01 inch long tube being 1 inch.

I claim:

1. A cured, thermoset composition comprising the product of an epoxy-terminated silane cured in the presence of from 0.05 to 5% by weight of a polymer from the group consisting of polyvinyl butyral, polyvinyl formal, polyvinyl pyrrolidone, ethylcellulose, cellulose acetate propionate, cellulose acetate butyrate, and polyvinylchloride, said composition comprising at least 15% by weight of a cured epoxy-terminated silane and exhibiting no more than 30% haze according to ASTM D-968-51.

2. A cured, thermoset composition bonded to a substrate, said composition comprising the product of an epoxy-terminated silane cured in the presence of from 0.05 to 5% by weight of a polymer from the group consisting of polyvinyl butyral, polyvinyl formal, polyvinyl pyrrolidone, ethylcellulose, cellulose acetate propionate, cellulose acetate butyrate, and polyvinylchloride wherein said composition was bonded to said substrate during cure of said composition, said composition comprising at least 15% by weight of a cured epoxy-terminated silane and exhibiting no more than 30% haze according to ASTM D-968-51.

3. The cured composition of claim 2 wherein the epoxy-terminated silane is cured in the further presence of materials selected from the group consisting of materials copolymerizable with epoxy resins and materials copolymerizable with siloxanes.

4. The cured composition of claim 3 wherein the composition is cured as a layer upon a substrate and is bonded to said substrate during said cure.

5. The cured composition on a substrate of claim 2 wherein the surface of the substrate is coated with a primer to enhance the bonding between the composition and the substrate.

6. The cured composition on a substrate of claim 4 wherein the surface of the substrate is coated with a primer to enhance the bonding between the composition and the substrate.

7. The composition of claim 2 wherein said epoxy terminated silanes are represented by the formulae:

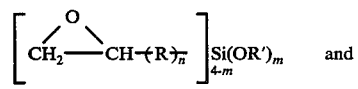 and

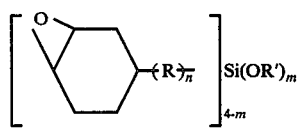

wherein
each R is independently a divalent hydrocarbon radical of less than 20 carbon atoms, or a divalent radical of less than 20 carbon atoms the backbone of which is C atoms which may be interrupted by individual atoms from the group of N and O, the O atoms in the form of ether linkages,
$m$ is 1, 2, or 3,
$n$ is 0, or 1, and R' is an aliphatic hydrocarbon radical of less than 10 carbon atoms, an acyl radical of less than 10 carbon atoms, or a radical of the formula $(CH_2CH_2O)_kZ$ in which $k$ is an integer of at least 1, and Z is hydrogen or an aliphatic hydrocarbon radical of less than 10 carbon atoms.

8. The composition of claim 7 wherein the composition has been cured in the presence of a catalytically active amount of a highly fluorinated aliphatic sulfonylic or sulfonic catalyst.

9. The composition of claim 8 wherein said highly fluorinated aliphaticsulfonylic catalyst is represented by the formula:

$$(R_fSO_2)Q(R_f'SO_2)$$

wherein
$R_f$ and $R_f'$ are independently a highly fluorinated alkyl group, and
Q is a divalent radical selected from —NH— and —CHR— wherein R is selected from Br, Cl, I, alkyl groups of 1 to 20 carbon atoms, aryl or aralkyl of up to 20 carbon atoms, or R'—X wherein R' is an alkalene group of up to 4 carbon atoms, and X is Br, Cl, I, —O$_2$SR$_f$,

wherein $n$ is 0, 1, 2, or 3, or —CY(COOR$^2$)$_2$ wherein Y is hydrogen, Br, or —NO$_2$, and R$^2$ is selected from alkyl of 1 to 4 carbon atoms and phenylalkyl, the alkyl group of which has up to 4 carbon atoms.

10. The composition of claim 9 wherein said highly fluorinated catalyst is a perfluorinated alkylsulfonylic catalyst.

11. The composition of claim 8 wherein said highly fluorinated aliphatic sulfonic catalyst is represented by the formula:

wherein R is selected from hydrogen, ammonium cation and metal cation and $n$ is the valence of R.

12. The composition of claim 2 wherein the composition has been cured in the presence of at least one compound of the formula $$R_mM(OR')_n$$

wherein
M is Si, Al, Zr, or Ti,
R is a hydrocarbon group of less than 10 carbon atoms or a group composed of hydrogen, carbon and oxygen of less than 20 carbon atoms,
R' is alkyl or acyl of less than 10 carbon atoms,
$m$ is 0, 1, 2 or 3, and
$n$ is 4, 3, 2, or 1.

* * * * *